US012203388B1

(12) United States Patent
Spangler et al.

(10) Patent No.: US 12,203,388 B1
(45) Date of Patent: Jan. 21, 2025

(54) DUAL TIP FLAG

(71) Applicant: RTX Corporation, Farmington, CT (US)

(72) Inventors: Brandon W. Spangler, Vernon, CT (US); Dominic J. Mongillo, Jr., West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/516,452

(22) Filed: Nov. 21, 2023

(51) Int. Cl.
*F01D 5/18* (2006.01)

(52) U.S. Cl.
CPC .......... *F01D 5/186* (2013.01); *F05D 2220/32* (2013.01); *F05D 2240/30* (2013.01); *F05D 2250/185* (2013.01); *F05D 2260/202* (2013.01)

(58) Field of Classification Search
CPC ...... F01D 5/186; F01D 5/187; F05D 2250/18; F05D 2260/202; F05D 2240/307
See application file for complete search history.

(56) References Cited

U.S. PATENT DOCUMENTS 7,806,658 B2 * 10/2010 Liang ...................... F01D 5/187 416/97 R
8,702,391 B2 4/2014 Bregman et al.
8,920,123 B2 * 12/2014 Lee ......................... F01D 5/186 416/97 R
9,447,692 B1 9/2016 Liang
10,294,799 B2 5/2019 Spangler
10,465,529 B2 * 11/2019 Clum ........................ F01D 9/02
2008/0085193 A1 * 4/2008 Liang ...................... F01D 5/187 416/97 R
2018/0298763 A1 * 10/2018 Lee .......................... F01D 5/20

* cited by examiner

*Primary Examiner* — Eldon T Brockman
(74) *Attorney, Agent, or Firm* — Kinney & Lange, P.A.

(57) ABSTRACT

A turbine blade includes a platform, a root section, and an airfoil section extending from the platform to a tip. The airfoil section includes a leading edge and a trailing edge extending from the platform to the tip. A tip wall is at the tip and extends from the leading edge to the trailing edge. A first core passage extends from the root section to the tip wall between the leading edge and the trailing edge. A first tip flag passage extends adjacent to the tip wall from the first core passage to a first flag outlet on the trailing edge. A second tip flag passage extends toward the leading edge from a second flag outlet on the trailing edge and is between the first tip flag passage and the root section. A second core passage extends from the root section to the second tip flag passage.

20 Claims, 5 Drawing Sheets

DUAL TIP FLAG

STATEMENT OF GOVERNMENT INTEREST

This invention was made with Government support under Contract N00019-21-G-0005 awarded by the United States Naval Air Systems Command. The Government has certain rights in this invention.

BACKGROUND

The present disclosure relates to gas turbine engines, and in particular, to turbine rotor blades.

A gas turbine engine typically includes a fan section, a compressor section, a combustor section and a turbine section. Air entering the compressor section is compressed and delivered into the combustion section where it is mixed with fuel and ignited to generate a hot and high-speed exhaust gas flow. The high-speed exhaust gas flow expands through the turbine section to drive the compressor and the fan section.

The turbine section includes turbine vanes to guide and direct the high-speed exhaust gas flow across turbine rotor blades in the turbine section. As the high-speed exhaust gas flow across the turbine rotor blades, the high-speed exhaust gas flow rotates the rotor blades to power the compressor section and/or the fan section. To withstand the high temperatures of the high-speed exhaust gas flow, the turbine vanes and turbine blades require cooling. Cooling air for cooling the turbine vanes and the turbine blades is generally bled from the compressor section and directed to the turbine vanes and the turbine blades. Various cooling schemes have been proposed to optimize the cooling of the turbine vanes and the turbine blades.

SUMMARY

A turbine blade includes a platform with a top side and a bottom side opposite the top side. A root section extends from the bottom side of the platform and an airfoil section extends from the top side of the platform to a tip of the turbine blade. The airfoil section includes a leading edge extending from the top side of the platform to the tip. A trailing edge extends from the top side of the platform to the tip and is aft of the leading edge. A pressure side extends from the leading edge to the trailing edge and extends from the top side of the platform to the tip. A suction side extends from the leading edge to the trailing edge and extends from the top side of the platform to the tip. A tip wall is at the tip and extends from the leading edge to the trailing edge. A first core passage extends in a predominately straight direction radially outward from the root section to the tip wall between the leading edge and the trailing edge. An outer first tip flag passage extends in a predominately axial streamwise direction adjacent to the airfoil tip wall from at least one first core passage to a first flag outlet, approximate the airfoil trailing edge. A second tip flag passage extends in predominately an axial streamwise direction toward the leading edge from a second flag outlet approximate the airfoil trailing edge and is between the outer first tip flag passage and the root section. At least one second core passage is between the first core passage and the trailing edge. The second core passage is a serpentine passage that extends in a predominately straight radial direction from the root section to the second tip flag passage. The second core passage is fluidically connected in a predominately axial streamwise direction to the second tip flag passage opposite the second flag outlet approximate the airfoil trailing edge.

A turbine blade includes a base and a tip radially outward from the base in a radial direction. An airfoil section extends from the base to the tip. The airfoil section includes a leading edge extending radially outward from the base to the tip. A trailing edge extends radially outward from the base to the tip and is axially aft of the leading edge in an axial direction. An airfoil pressure side surface extends from the leading edge to the trailing edge and extends from the top side of the platform to the tip. An airfoil suction side surface extends from the leading edge to the trailing edge and extends from the top side of the platform to the tip. The convex suction side airfoil surface is opposite the concave pressure side airfoil surface in a circumferential direction. A tip wall is at the tip and extends axially from the leading edge to the trailing edge. At least one first core passage extends radially from the base to the tip wall between the leading edge and the trailing edge. A first flag wall is spaced radially inward from the tip wall and extends axially from a least one first core passage to the trailing edge. A first tip flag passage is between the tip wall and the first flag wall and extends predominately in an axial direction from the first core passage to a first flag outlet, approximate the airfoil trailing edge. A second flag wall is spaced radially inward from the first flag wall. The second flag wall extends in a predominate axial direction from the airfoil trailing edge toward the at least one first core passage. A second predominately axial tip flag passage is radially between the first flag wall and the second flag wall and extends toward the leading edge from a second flag outlet, approximate the airfoil trailing edge. A second core passage is predominately in an axial direction between the first core passage and the airfoil trailing edge. The at least one second core passage is a serpentine passage that extends from the base to the second tip flag passage. The at least one second core passage is fluidically connected to the second tip flag passage oriented in predominately an axial streamwise direction opposite to the second flag outlet approximate the airfoil trailing edge.

The present summary is provided only by way of example, and not limitation. Other aspects of the present disclosure will be appreciated in view of the entirety of the present disclosure, including the entire text, claims and accompanying figures.

Figure 1:
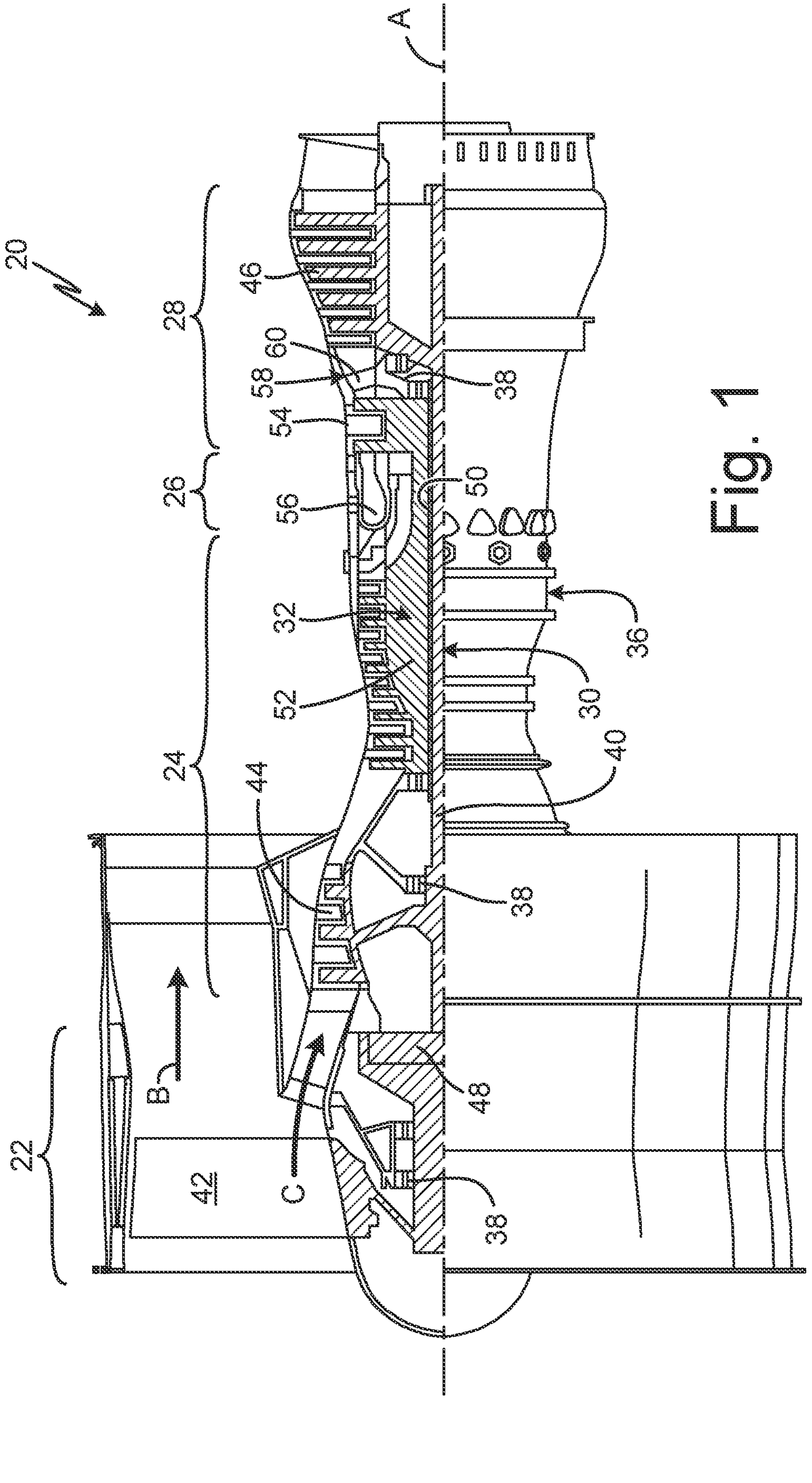
FIG. 1 is a partial cross-sectional view of a gas turbine engine.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

This disclosure relates to a turbine blade with a first outer tip flag passage oriented in a predominately axial direction adjacent to an outer tip surface of the turbine blade and a second tip flag passage that is radially located inboard under the first outer predominately axially oriented tip flag passage. At least one first core passage is radially oriented and fluidically connected to the first tip flag passage and extends directly from a root of the turbine blade to the predominately axially oriented outer first tip flag passage. Since the at least one first core passage supplies cooling air directly to the first outer predominately axially oriented tip flag passage, the cooling air in the at least one first radial core passage incurs minimal cooling air heat pickup prior to reaching the first outer predominately axially oriented cooling tip flag passage adjacent to the airfoil tip. Thus, the cooling air entering the first tip flag passage from the first core passage is primarily intended to cool the tip of the turbine airfoil blade. At least one second core passage is fluidically connected to the second predominately axially oriented cooling tip flag passage and fluidically extends from a fluidly connected series of predominately radially oriented cooling passages in a serpentine manner from the root of the turbine blade to the second tip flag passage. The at least one second core passage provides cooling air to a central portion of the turbine blade, and the second tip flag passage enables the cooling air flow capacity and mass flow rate in the at least one second core passage to be increased at a relatively high rate. As such the internal convective cooling performance of the at least one second core passage is increased due to the increased internal cavity Mach Numbers and Reynolds numbers. The turbine blade is discussed below with reference to the figures.

FIG. 1 is a cross-sectional view that schematically illustrates example gas turbine engine 20 that includes fan section 22, compressor section 24, combustor section 26 and turbine section 28. Fan section 22 drives air along bypass flowpath B while compressor section 24 draws air in along core flowpath C where air is compressed and communicated to combustor section 26. In combustor section 26, air is mixed with fuel and ignited to generate a high-pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low-pressure turbine to drive a fan via a gearbox, an intermediate spool that enables an intermediate pressure turbine to drive a first compressor of the compressor section, and a high spool that enables a high-pressure turbine to drive a high-pressure compressor of the compressor section.

The example gas turbine engine 20 generally includes low speed spool 30 and high speed spool 32 mounted for rotation about center axis A of gas turbine engine 20 relative to engine static structure 36 via several bearing systems 38. It should be understood that various bearing systems 38 at various locations may alternatively or additionally be provided.

Low speed spool 30 generally includes inner shaft 40 that connects fan 42 and low-pressure (or first) compressor section 44 to low-pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high-pressure (or second) compressor section 52 and high-pressure (or second) turbine section 54. Inner shaft 40 and outer shaft 50 are concentric and rotate via bearing systems 38 about center axis A.

Combustor 56 is arranged between high-pressure compressor 52 and high-pressure turbine section 54. In one example, high-pressure turbine section 54 includes at least two stages to provide double stage high-pressure turbine section 54. In another example, high-pressure turbine section 54 includes only a single stage. As used herein, a "high-pressure" compressor or turbine experiences a higher pressure than a corresponding "low-pressure" compressor or turbine. The example low-pressure turbine section 46 has a pressure ratio that is greater than about 5. The pressure ratio of the example low-pressure turbine section 46 is measured prior to an inlet of low-pressure turbine section 46 as related to the pressure measured at the outlet of low-pressure turbine section 46 prior to an exhaust nozzle.

Mid-turbine frame 58 of engine static structure 36 can be arranged generally between high-pressure turbine section 54 and low-pressure turbine section 46. Mid-turbine frame 58 further supports bearing systems 38 in turbine section 28 as well as setting airflow entering the low-pressure turbine section 46. Mid-turbine frame 58 includes vanes 60, which are in the core flowpath and function as inlet guide vanes for low-pressure turbine section 46.

The gas flow in core flowpath C is compressed first by low-pressure compressor 44 and then by high-pressure compressor 52. The gas flow in core flowpath C is then mixed with fuel and ignited in combustor 56 to produce high speed exhaust gases that are then expanded through high-pressure turbine section 54 and low-pressure turbine section 46. As discussed below with reference to FIG. 2, high-pressure turbine section 54 and low-pressure turbine section 46 include turbine vanes to guide the gas flow through high-pressure turbine section 54 and low-pressure turbine section 46 and include turbine blades that are worked and rotated by the gas flow.

Figure 2:
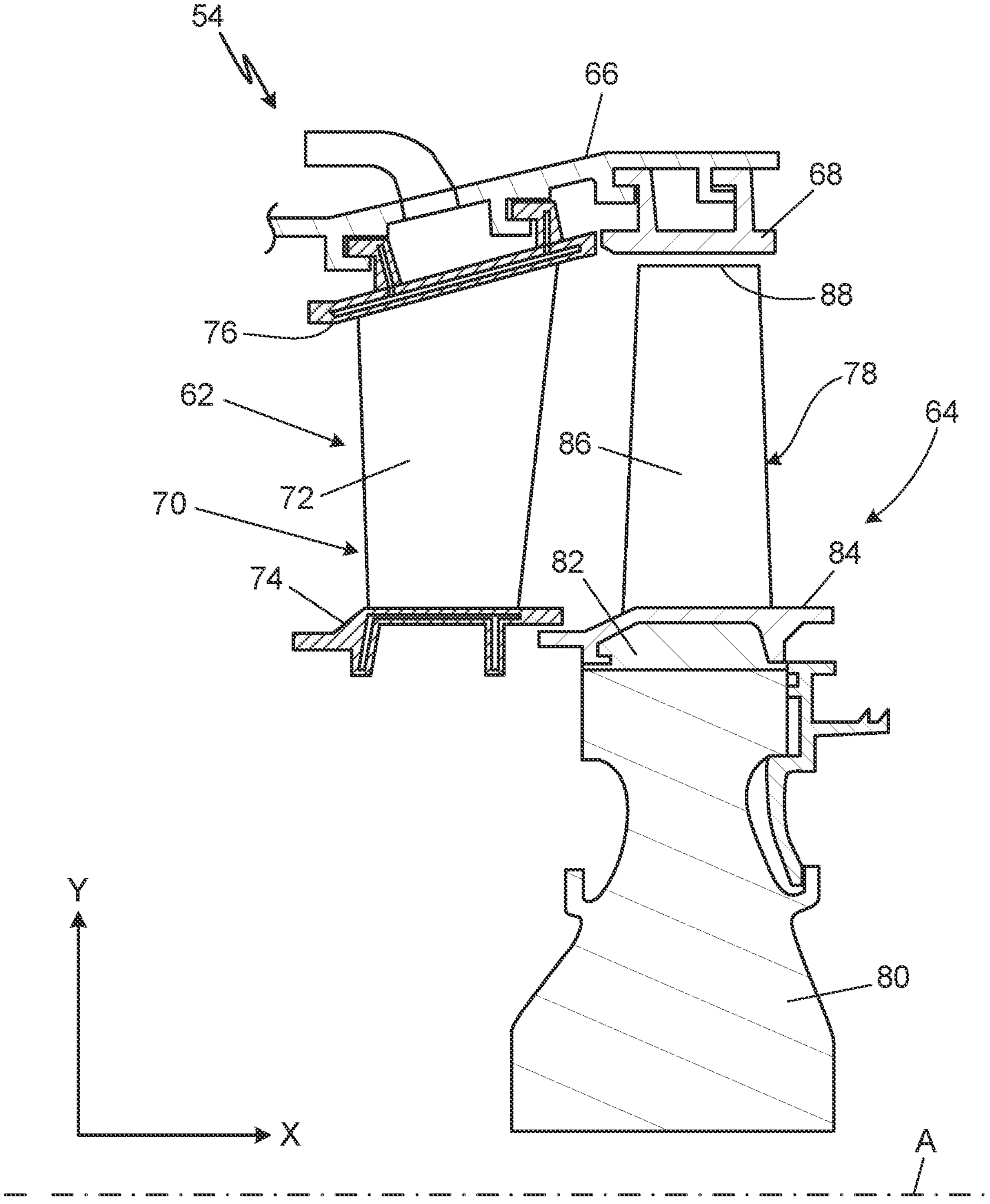
FIG. 2 is a cross-sectional view of a turbine section of the gas turbine engine of FIG. 1.

FIG. 2 is a cross-sectional view of high-pressure turbine section 54 of gas turbine engine 20 of FIG. 1. As shown in FIG. 2, high-pressure turbine section 54 includes vane stage 62, rotor stage 64, case 66, and blade outer air seal (BOAS) 68. Vane stage 62 includes vanes 70, with each of vanes 70 including airfoil section 72 extending between inner platform 74 and outer platform 76 to define a portion of core flowpath C. Rotor stage 64 includes turbine blades 78 connected to rotor disk 80. Each of turbine blades 78 includes root section 82, platform 84, airfoil section 86, and tip 88. An axial direction X and a radial direction Y are shown in FIG. 2. The axial direction X is parallel to center axis A and the radial direction Y extends radially outward from the axial direction X.

In the example of FIG. 2, vane stage 62 is axially forward and upstream from rotor stage 64 and guides and conditions the gas flow in core flowpath C before the gas flow reaches rotor stage 64. Each turbine blade 78 is connected to rotor disk 80 by root section 82 such that turbine blades 78 are circumferentially arrayed about rotor disk 80 and center axis A. Platform 84 for each turbine blade 78 is connected to root section 82 and forms a radially inner flowpath surface for core flowpath C across rotor stage 64. Airfoil section 86 on each turbine blade 78 extends radially outward from platform 84 to tip 88. BOAS 68 is spaced radially outward from tip 88 of each turbine blade 78 and extends circumferentially about rotor stage 64 and center axis A. BOAS 68 forms a radially outer flowpath surface for core flowpath C across rotor stage 64. Case 66 is a stationary structure that extends circumferentially around vane stage 62 and rotor stage 64 and supports vane stage 62 and BOAS 68. While high-pressure turbine section 54 is shown in FIG. 2 has having a single vane stage 62 and a single rotor stage 64, high-pressure turbine section 54 can have multiple rotor stages 64 and multiple vane stages 62. Low-pressure turbine section 46 can also include multiple rotor stages 64 and multiple vane stages 62.

Figure 3:
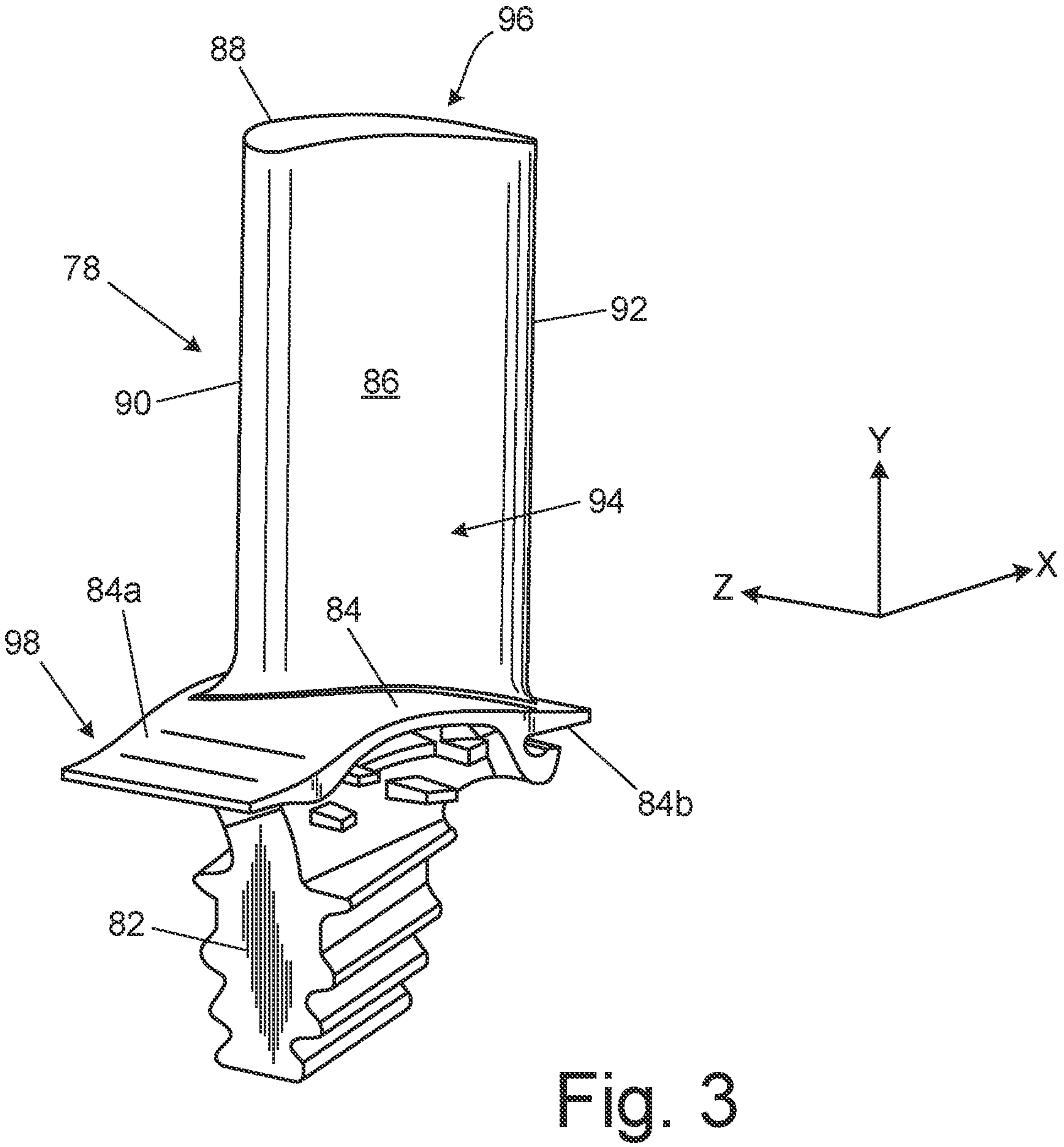
FIG. 3 is a perspective view of a turbine blade from the turbine section of FIG. 2.

FIG. 3 is a perspective view of turbine blade 78 from rotor stage 64 of FIG. 2. As previously noted above with reference to FIG. 2, turbine blade 78 includes root section 82, platform 84, airfoil section 86, and tip 88. Airfoil section 86 of turbine blade 78 includes leading edge 90, trailing edge 92, pressure surface 94, and suction surface 96. Root section 82 and/or platform 84 form base 98 of turbine blade 78.

Top side 84*a* of platform 84 forms an inner endwall flow surface of turbine blade 78. Bottom side 84*b* is opposite top side 84*a* in the radial direction Y and is outside of core flowpath C. Root section 82 extends from bottom side 84*b* of platform 84. As shown in FIG. 3, root section 82 can be a dovetail root for connecting turbine blade 78 to rotor disk 80. Root section 82 and/or platform 84 can form base 98 of turbine blade 78.

Tip 88 of turbine blade 78 is radially outward from base 98 in the radial direction Y. Airfoil section 86 extends from top side 84*a* of platform 84 to tip 88 of turbine blade 78. Leading edge 90 extends radially outward from top side 84*a* of platform 84 in the radial direction Y to tip 88. Trailing edge 92 also extends radially outward from top side 84*a* of platform 84 to tip 88 and is aft of leading edge 90 in the axial direction X.

Pressure side 94 is a generally concave surface of airfoil section 86 that extends from leading edge 90 to trailing edge 92 and also extends from top side 84*a* of platform 84 to tip 88. Suction side 96 is a generally convex surface of airfoil section 86 that extends from leading edge 90 to the trailing edge 92 and extends from top side 84*a* of platform 84 to tip 88. Suction side 96 is opposite pressure side 94 in a circumferential direction Z, the circumferential direction Z generally being a direction of rotation of turbine blade 78 about center axis A of gas turbine engine 20 of FIG. 1. To withstand the high temperatures of the high-speed exhaust gas flow passing though high-pressure turbine section 54 and low-pressure turbine section 46 along core flowpath C, turbine blade 78 requires cooling. An internal cooling scheme of turbine blade 78 is discussed below with reference to FIG. 4.

Figure 4:
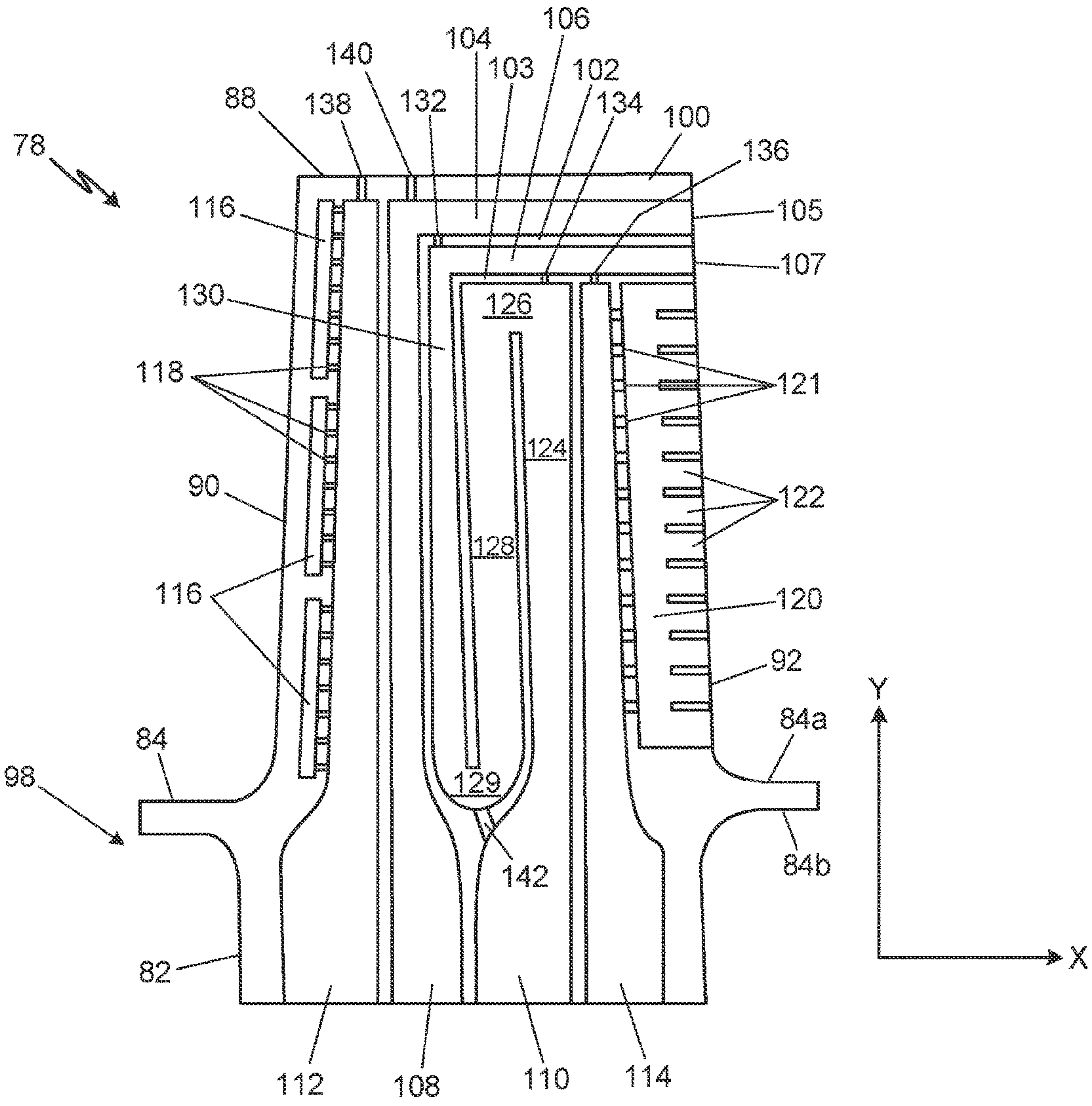
FIG. 4 is a cross-sectional view of the turbine blade from FIG. 3 taken on a radial-axial plane and showing an example of a cooling of the turbine blade.

FIG. 4 is a cross-sectional view of turbine blade 78 showing an internal cooling scheme of turbine blade 78. As shown in FIG. 4, turbine blade 78 can further include tip wall 100, first flag wall 102, second flag wall 103, first tip flag passage 104, first flag outlet 105, second tip flag passage 106, second flag outlet 107, first core passage 108, second core passage 110, leading edge core passage 112, trailing edge core passage 114, a plurality of leading edge cavities 116, a plurality of leading-edge cross-over apertures 118, trailing edge cavity 120, a plurality of trailing-edge cross-over apertures 121, and trailing edge outlets 122. Second core passage 110 includes first up pass 124, first bend 126, down pass 128, second bend 129, and second up pass 130. Turbine blade 78, as shown in FIG. 4, can also include first aperture 132, second aperture 134, third aperture 136, fourth aperture 138, fifth aperture 140, and sixth aperture 142.

In the example of FIG. 4, tip wall 100 forms tip 88 and extends axially from leading edge 90 to trailing edge 92. In other examples, a tip pocket can be formed radially outward from tip wall 100. First core passage 108 extends straight in the radial direction from base 98 to tip wall 100 and is axially between leading edge 90 and trailing edge 92. First flag wall 102 is spaced radially inward from tip wall 100 and extends axially from first core passage 108 to trailing edge 92. First tip flag passage 104 is adjacent to tip wall 100 and is defined by tip wall 100 and first flag wall 102. First tip flag passage 104 extends between tip wall 100 and first flag wall 102 and extends axially from first core passage 108 to first flag outlet 105 on trailing edge 92. First tip flag passage 104 fluidically connects first core passage 108 to first flag outlet 105 such that first tip flag passage 104 and first core passage 108 form a continuous passage from root section 82 to first flag outlet 105.

Second flag wall 103 is spaced radially inward from first flag wall 102. Second flag wall 102 extends axially from trailing edge 92 toward first core passage 108. Second tip flag passage 106 is radially between first flag wall 102 and second flag wall 103 and extends toward axially toward leading edge 90 from second flag outlet 107 on trailing edge 92 to a wall dividing first core passage 108 from second core passage 110. Second core passage 110 is axially between first core passage 108 and trailing edge 92. Second core passage 110 is a serpentine passage extending from root section 82 to second tip flag passage 106. Second core passage 110 fluidically connects to second tip flag passage 106 axially opposite to second flag outlet 107 such that second core passage 110 and second tip flag passage 106 form a continuous passage from root section 82 to second flag outlet 107.

First up pass 124, first bend 126, down pass 128, second bend 129, and second up pass 130 together form the serpentine passage of second core passage 110. First up pass 124 extends from root section 82 toward first bend 126. First bend 126 is radially between root section 82 and second tip flag passage 106. In the example of FIG. 4, first bend 126 is adjacent to second flag wall 103 such that second flag wall 103 separates first bend 126 from second tip flag passage 106. First bend 126 forms a 180 degree turn that bends second core passage 110 from a radially upward direction to a radially downward direction as second core passage 110 moves from first up pass 124 to down pass 128. Down pass 128 is positioned axially between first up pass 124 and first core passage 108, and down pass 128 extends toward root section 82 from first bend 126 to second bend 129 of second core passage 110. Second bend 129 can be positioned radially near a height of platform 84 and forms a 180 degree turn that bends second core passage 110 from a radially downward direction to a radially upward direction as second core passage 110 moves from down pass 128 to second up pass 130. Second up pass 130 extends radially from second bend 129 to second tip flag passage 106. Second up pass 130 is positioned axially between down pass 128 and first core passage 108.

Leading edge core passage 112 extends straight and radially from root section 82 to tip wall 100. Leading edge core is between leading edge 90 and first core passage 108 in the axial direction X. A wall is axially between leading edge core passage 112 and first core passage 108 and separates leading edge core passage 112 from first core passage 108 and first tip flag passage 104. Leading edge cavities 116, also referred to as leading edge boxcar cavities 116, are formed axially between leading edge 90 and leading edge core passage 112. Leading edge cavities 116 are radially spaced apart from each other and aligned along leading edge 90. Leading-edge cross-over apertures 118 extend axially from leading edge core passage 112 to leading edge cavities 116 to fluidically connect leading edge cavities 116 with leading edge core passage 112.

Trailing edge core passage 114 extends straight and radially from root section 82 to second flag wall 103 and is axially between second core passage 110 and trailing edge 92 relative to the axial direction X. Trailing edge cavity 120 is formed axially between trailing edge core passage 114 and trailing edge 92 and radially between platform 84 and second flag wall 103. Trailing-edge cross-over apertures 121 extend axially from trailing edge core passage 114 to trailing edge cavity 120 to fluidically connect trailing edge cavity 120 with trailing edge core passage 114. Trailing edge outlets 122 are formed along trailing edge 92 and extend from trailing edge 92 to trailing edge cavity 120.

In the example of FIG. 4, each of tip wall 100, first flag wall 102, second flag wall 103, first tip flag passage 104, first flag outlet 105, second tip flag passage 106, second flag outlet 107, first core passage 108, second core passage 110, leading edge core passage 112, trailing edge core passage 114, leading edge cavities 116, trailing edge cavity 120, and trailing edge outlets 122 can extend from pressure surface 94 to suction surface 96. Each of first up pass 124, first bend 126, down pass 128, second bend 129, and second up pass 130 of second core passage 110 can also extend from pressure surface 94 to suction surface 96.

First aperture 132 is formed in first flag wall 102 and extends from first tip flag passage 104 to second tip flag passage 106. In the example of FIG. 4, first aperture 132 is axially aligned with second up pass 130 of second core passage 110 relative to the axial direction X. Second aperture 134 is formed in second flag wall 103 and extends from first bend 126 to second tip flag passage 106. Second aperture 134 fluidically connects first bend 126 and second tip flag passage 106. Second aperture 134 is aligned with the first up pass 124 relative to the axial direction X. Third aperture 136 is formed in second flag wall 103 and extends from a radially outer end of trailing edge core passage 114 to second tip flag passage 106. Third aperture 136 fluidically connects trailing edge core 114 and second tip flag passage 106. Fourth aperture 138 extends from leading edge core passage 108 through a thickness of tip wall 100. Fifth aperture 140 extends from first tip flag passage 104 through a thickness of tip wall 100. In the example of FIG. 4, fifth aperture 140 is aligned with first core passage 108. Sixth aperture 142 extends from second bend 129 of second core passage 110 to a portion of first up pass 124 near root section 82. First aperture 132, second aperture 134, third aperture 136, fourth aperture 138, fifth aperture 140, and sixth aperture 142 can originate from six core ties used to fix ceramic cores during casting of turbine blade 78. While the example of turbine blade 78 in FIG. 4 shows all of the six apertures as open, in some examples any of the six apertures can be filled and closed after casting of turbine blade 78.

During operation of turbine blade 78, a supply of cooling air is bled from low-pressure compressor 44 and/or high-pressure compressor 52 (shown in FIG. 1) and directed to root section 82 of turbine blade 78. As the cooling air reaches root section 82 of turbine blade 78, the cooling air is subdivided into first core passage 108, second core passage 110, leading edge core passage 112, and trailing edge core passage 114. The cooling air that enters leading edge core passage 112 flows up through leading edge core passage 112 to tip wall 100. Some of the cooling air inside leading edge core passage 112 flows through leading-edge cross-over apertures 118 into leading edge cavities 116 where the cooling air impinges on a back side of leading edge 90 to cool leading edge 90. The cooling air inside of leading edge cavities 116 can exit leading edge cavities 116 via cooling holes (not shown) formed on or near leading edge 90. Some of the cooling air inside of leading edge core passage 112 flows through fourth aperture 138 to help cool tip 88 and prevent stagnation from occurring in the end of leading edge core passage 112. In examples of turbine blade 78 where tip 88 includes a squealer tip pocket or shelf, fourth aperture 138 can be used to supply cooling air from leading edge core passage 112 to the squealer tip pocket or shelf. Fourth aperture 138 can also be large enough to purge dirt or particulate that happens to enter leading edge core passage 112.

Cooling air that enters first core passage 108 at root section 82 flows directly up through first core passage 108 to tip wall 100, then turns into first tip flag passage 104 and flows through first tip flag passage 104 to first flag outlet 105. The relatively lower pressure at trailing edge 92 and first flag outlet 105 helps pull the cooling air across first tip flag passage 104 at a relatively fast rate and helps reduce the likelihood of turbulence or stagnation occurring at the turn between first core passage 108 and first tip flag passage 104. As the cooling air moves through first tip flag passage 104, the cooling air cools tip wall 100 and tip 88 of turbine blade 78. Since first core passage 108 is a straight passage with no turns between root section 82 and tip 88, the cooling air reaches the airfoil tip 88 quickly resulting from the relatively short distance the cooling air has to travel. The increase in the cooling air temperature is minimized by mitigating the heat flux and the convection that occurs between the hotter exterior airfoil wall surfaces to the cooling air. Thus, the cooling air temperature heat pickup is significantly reduced. As such the heat that the cooling air can absorb while traveling inside of the at least one first core passage 108 from root section 82 to tip 88 enables greater thermal cooling potential adjacent to the hot airfoil blade tip surface which results in lower operating metal temperatures and increased blade tip durability. During operation of turbine blade 78, tip 88 can be exposed to higher temperatures than any other part of turbine blade 78. Thus, supplying cooling air directly from root section 82 (where the cooling air is the coolest) to tip 88, and minimizing the amount of heat the cooling air absorbs in transit, can be very beneficial to cooling tip 88 extending the operation life of tip 88 and turbine blade 78. Some of the cooling air inside of first core passage 108 flows through fifth aperture 140 to help cool tip 88 and prevent stagnation from occurring in the turn between first core passage 108 and first tip flag passage 104. In examples of turbine blade 78 where tip 88 includes a squealer tip pocket or shelf, fifth aperture 140 can be used to supply cooling air from first core passage 108 to the squealer tip pocket or shelf. Fifth aperture 140 can also be large enough to purge dirt or particulate that happens to enter first core passage 108.

Cooling air that enters the at least one second core passage 110 at root section 82 first flows up through first up pass 124, then turns 180 degrees through first bend 126, then flows radially inward through down pass 128 to second bend 126, turns 180 degrees through second bend 129, and then flows radially outward through second up pass 130. After flowing through second up pass 130, the cooling air in second core passage 110 turns into the second predominately axially oriented tip flag passage 106 and flows axially aftward to second flag outlet 107 approximate the airfoil trailing edge 92. The relatively lower sink pressure at the airfoil trailing edge 92 and second tip flag outlet 107 helps to increase the flow capacity of the cooling air mass flow rate through the serpentine passages of the at least on second core passage 110. The increased mass flow rate enabled by the second axially oriented tip flag passage 106 mitigates the likelihood of internal cooling flow separation, recirculation, or stagnation occurring inside second core passage 110, resulting in significantly reduced internal convective heat transfer, cooling effectiveness, and thermal performance.

It shall be noted that in some embodiments that the flow capacity of second core passage 110 may further be increased by incorporating several film cooling hole apertures along the second predominately axial oriented tip flag passage 106. The addition of film cooling hole apertures increases the cooling mass flow rate in the at least one second core passage 110, which improves the internal convective heat transfer and thermal cooling effectiveness in the central portion of airfoil section 72 of turbine blade 78. The additional film cooling also mitigates local hot external heat flux that is present along the external pressure side airfoil surface, both approximate the second tip flag passage 106, and along the first outer most tip flag passage 104. As such further reductions in local operating metal temperature can be achieved thereby improving the durability of the turbine blade airfoil component. The additional film apertures in the second predominately axially oriented tip flag passage 106 also help mitigate the higher local metal temperatures resulting from the additional cooling air heat pickup observed in the longer second core passage 110.

The at least one second core passage 110 cools a central portion of turbine blade 78. As there are no dead ends inside of second core passage 110, the cooling air through second core passage 110 moves at relatively high flow rates and Mach numbers, which increases heat transfer and cooling of the central portion of turbine blade 78. Second tip flag passage 106 also spaces first bend 126 from tip 88, which decreases the overall length of first up pass 124. Decreasing the overall length of first up pass 124 reduces the amount of time and distance that the cooling air travels in first up pass 124, which reduces the amount of heat the cooling air absorbs before turning in first bend 126 and being directed back towards the cooler temperatures of root section 82. Some of the cooling air inside of first up pass 124 and first bend 126 flows through second aperture 134 and into second tip flag passage 106. The flow of cooling air through second aperture 134 can help the flow of cooling air through first up pass 124 and first bend 126 by reducing stagnation in first bend 126. Sixth aperture 142 can help the flow of cooling air through second bend 129 and second up pass 130 by injecting fresh cooling air from root section 82 into second bend 129. The injection of fresh cooling air from sixth aperture 142 can help cool the flow inside of second core passage 110 and can reduce stagnation at second bend 129. Since the cooling flow in second core passage 110 travels a longer, more circuitous route than the cooling flow in first core passage 108, the pressure in second tip flag passage 106 is lower than the pressure in first tip flag passage 104. This results in a small amount of cooling air inside of first tip flag passage 104 flowing through first aperture 132 into second tip flag passage 106 to prevent stagnation and separation from occurring in the turn between second up pass 130 and second tip flag passage 106. First aperture 132, second aperture 134, and sixth aperture 142 can each be large enough to purge dirt or particulate that happens to enter second core passage 110.

The cooling air that enters trailing edge core passage 114 flows up through leading edge core passage 112 to second flag wall 103. Most of the cooling air inside trailing edge core passage 114 flows through trailing-edge cross-over apertures 121 into trailing edge cavity 120. The cooling air inside of trailing edge cavity 120 can exit trailing edge cavity 120 via trailing edge outlets 122. Some of the cooling air inside of trailing edge core passage 114 flows through third aperture 136 and into second tip flag passage 106 to help reduce or prevent stagnation from occurring in the end of trailing edge core passage 114. Third aperture 136 can also be large enough to purge dirt or particulate that happens to enter trailing edge core passage 114.

First, second, and third apertures 132, 134, 136 can be sized appropriately to balance the amount of cooling flow travelling through the second core passage 110 with the cooling flow temperature exiting second tip flag passage 106 at second tip flag outlet 107. In other words, the larger the first, second, and third apertures 132, 134, and 136, the less cooling flow travelling through the entire serpentine of second core passage 110, but the colder the cooling flow temperature exiting the second tip flag outlet 107 due to a larger portion of the cooling flow exiting second tip flag outlet 107 travelling a shorter distance.

Figure 5:
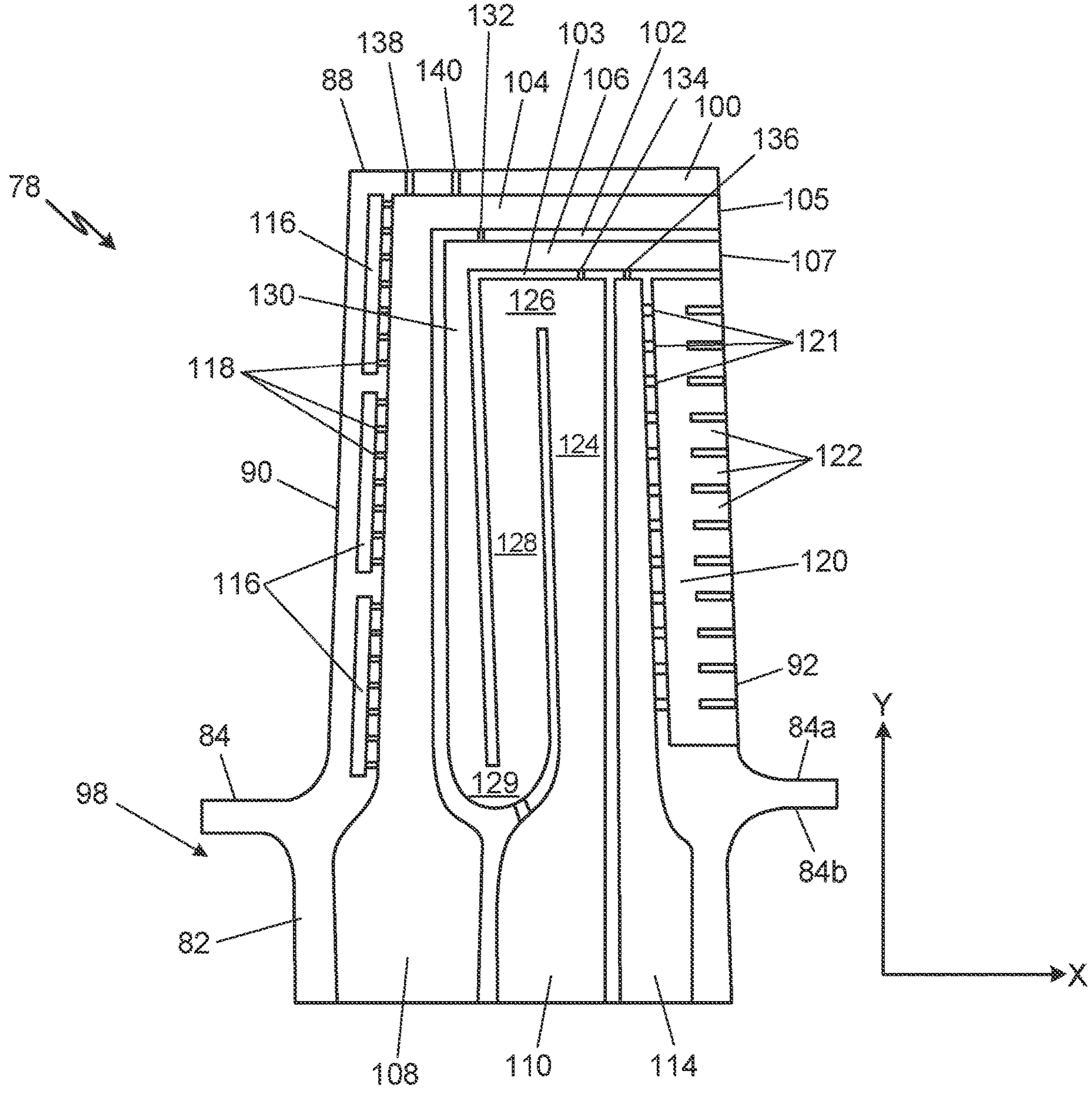
FIG. 5 is a cross-sectional view of the turbine blade from FIG. 3 taken on a radial-axial plane and showing another example of a cooling of the turbine blade.

FIG. 5 is a cross-sectional view of turbine blade 78 showing another example of an internal cooling scheme of turbine blade 78. The example of FIG. 5 is similar to the example of FIG. 4, except leading edge core 112 has been omitted and leading-edge cross-over apertures 118 extend axially from first core passage 108 to leading edge cavities 116 to fluidically connect leading edge cavities 116 with first core passage 108. In the example of FIG. 5, first core passage 108 supplies cooling air to first tip flag passage 104 to cool tip 88, and first core passage 108 supplies cooling air to leading edge cavities 116 to cool leading edge 90.

Although FIG. 4 and FIG. 5 show second core passage as being a 3-pass serpentine with two up passes and one down pass, second core passage 110 could have any number of up passes and down passes before the last up pass connecting to second tip flag passage 106. Moreover, the trailing edge core passage 114 may be eliminated and trailing edge crossover apertures 121 may connect directly to first up pass 124 of second core passage 110.

Although not depicted it shall be recognized that internal cooling features such as trip strips, turbulators, circular/oblong pedestals, dimples, delta shaped features of various sizes and shapes may be incorporated and distributed to optimize internal pressure loss, local convective heat transfer and cooling effectiveness requirements to meet component durability requirements.

Although not depicted it shall be recognized that film cooling flow apertures may also be incorporated to further optimize and tailor both internal convective heat transfer and film cooling characteristics. The location, type, quantity, and spacing requirements may be tailored to mitigate turbine airfoil locations that are subjected to higher external heat flux due to external gas temperature distributions and aerodynamic design geometries and loading requirements.

Although not depicted it shall be recognized that the radial passages and axial tip flag passage cavity area distributions may be uniquely sized to meet internal convective cooling, pressure loss, based on allotted turbine blade cooling flow, stage efficiency, and turbine performance efficiency requirements.

Although not depicted it shall be recognized that the invention disclosed herein may also be applied to static turbine vane cooling design applications to mitigate locally high OD and ID airfoil metal temperatures to address local thermal, and thermal-mechanical structural limitations attributed to non-uniformities in vane airfoil and ID/OD platform operating metal temperatures and stresses resulting in thermal mechanical fatigue and creep bending failure mechanisms due to high external unsteady and steady gas pressure loads due upstream blade passing frequencies.

DISCUSSION OF POSSIBLE EMBODIMENTS

The following are non-exclusive descriptions of possible embodiments of the present invention.

In one example, a turbine blade includes a platform with a top side and a bottom side opposite the top side. A root section extends from the bottom side of the platform and an airfoil section extends from the top side of the platform to a tip of the turbine blade. The airfoil section includes a leading edge extending from the top side of the platform to the tip. A trailing edge extends from the top side of the platform to the tip and is aft of the leading edge. A pressure side extends from the leading edge to the trailing edge and extends from the top side of the platform to the tip. A suction side extends from the leading edge to the trailing edge and extends from the top side of the platform to the tip. A tip wall is at the tip and extends from the leading edge to the trailing edge. A first core passage extends straight from the root section to the tip wall between the leading edge and the trailing edge. A first tip flag passage extends adjacent to the tip wall from the first core passage to a first flag outlet on the trailing edge. A second tip flag passage extends toward the leading edge from a second flag outlet on the trailing edge and is between the first tip flag passage and the root section. A second core passage is between the first core passage and the trailing edge. The second core passage is a serpentine passage that extends from the root section to the second tip flag passage. The second core passage is fluidically connected to the second tip flag passage opposite the second flag outlet.

The turbine blade of the preceding paragraph can optionally include, additionally and/or alternatively, any one or more of the following features, configurations and/or additional components:

- the second core passage comprises: a first up pass extending from the root section toward a first bend of the second core passage, wherein the first bend is between the root section and the second tip flag passage; a down pass extending toward the root section from the first bend to a second bend of the second core passage, wherein the down pass is positioned between the first up pass and the first core passage; and a second up pass extending to the second tip flag passage from the second bend, wherein the second up pass is positioned between the down pass and the first core passage;
- a leading edge core passage extending straight from the root section to the tip wall, wherein the leading edge core is between the leading edge and the first core passage;
- a plurality of leading edge cavities formed between the leading edge and the leading edge core passage; and a plurality of cross-over apertures fluidically connecting the plurality of leading edge cavities with the leading edge core passage;
- a trailing edge core passage extending straight from the root section toward the second tip flag passage and is between the second core passage and the trailing edge;
- a flag wall extending between the first tip flag passage and the second tip flag passage; a first aperture formed in the flag wall and extending from the first tip flag passage to the second tip flag passage, and wherein the first aperture is aligned with the second up pass;
- a second aperture extending from the first bend to the second tip flag passage and fluidically connecting the first bend and the second tip flag passage, wherein the second aperture is aligned with the first up pass;
- a third aperture extending from an outer end of the trailing edge core passage to the second tip flag passage and fluidically connecting the trailing edge core and the second tip flag passage, wherein the outer end of the trailing edge core passage is opposite the root section;
- a plurality of leading edge cavities formed between the leading edge and the first core passage; and a plurality of cross-over apertures fluidically connecting the plurality of leading edge cavities with the first core passage; and/or
- a gas turbine engine comprising the turbine blade of any preceding paragraph.

In another example, a turbine blade includes a base and a tip radially outward from the base in a radial direction. An airfoil section extends from the base to the tip. The airfoil section includes a leading edge extending radially outward from the base to the tip. A trailing edge extends radially outward from the base to the tip and is axially aft of the leading edge in an axial direction. A pressure side extends from the leading edge to the trailing edge and extends from the base to the tip. A suction side extends from the leading edge to the trailing edge and extends from the top side of the platform to the tip. The suction side is opposite the pressure side in a circumferential direction. A tip wall is at the tip and extends axially from the leading edge to the trailing edge. A first core passage extends radially from the base to the tip wall between the leading edge and the trailing edge. A first flag wall is spaced radially inward from the tip wall and extends axially from the first core passage to the trailing edge. A first tip flag passage is between the tip wall and the first flag wall and extends axially from the first core passage to a first flag outlet on the trailing edge. A second flag wall is spaced radially inward from the first flag wall. The second flag wall extends axially from the trailing edge toward the first core passage. A second tip flag passage is radially between the first flag wall and the second flag wall and extends toward the leading edge from a second flag outlet on the trailing edge. A second core passage is axially between the first core passage and the trailing edge. The second core passage is a serpentine passage that extends from the base to the second tip flag passage. The second core passage is fluidically connected to the second tip flag passage axially opposite to the second flag outlet.

The turbine blade of the preceding paragraph can optionally include, additionally and/or alternatively, any one or more of the following features, configurations and/or additional components:

- the second core passage comprises: a first up pass extending radially from the base toward a first bend of the second core passage, wherein the first bend is radially between the base and the second flag wall; a down pass extending toward the base from the first bend to a second bend of the second core passage, wherein the down pass is positioned axially between the first up pass and the first core passage; and a second up pass extending radially to the second tip flag passage from the second bend, wherein the second up pass is positioned axially between the down pass and the first core passage;

a leading edge core passage extending radially from the base to the tip wall, wherein the leading edge core is between the leading edge and the first core passage in the axial direction;

a plurality of leading edge boxcar cavities formed axially between the leading edge and the leading edge core passage; and a plurality of cross-over apertures extending axially from the leading edge core passage to the plurality of leading edge boxcar cavities to fluidically connect the plurality of leading edge boxcar cavities with the leading edge core passage;

a trailing edge core passage extending radially from the base to the second flag wall and is axially between the second core passage and the trailing edge relative to the axial direction;

a first aperture formed in the first flag wall and extending from the first tip flag passage to the second tip flag passage, and wherein the first aperture is axially aligned with the second up pass relative to the axial direction;

a second aperture formed in the second flag wall and extending from the first bend to the second tip flag passage and fluidically connecting the first bend and the second tip flag passage, and wherein the second aperture is aligned with the first up pass in the axial direction;

a third aperture formed in the second flag wall and extending from the trailing edge core passage to the second tip flag passage and fluidically connecting the trailing edge core and the second tip flag passage;

a plurality of leading edge boxcar cavities formed between the leading edge and the first core passage; and a plurality of cross-over apertures fluidically connecting the plurality of leading edge cavities with the first core passage; and a plurality of cross-over apertures extending axially from the first core passage to the plurality of leading edge boxcar cavities to fluidically connect the plurality of leading edge boxcar cavities with the first core passage; and/or a gas turbine engine comprising the turbine blade of any preceding paragraph.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbine blade comprising:

a platform comprising a top side and a bottom side opposite the top side;

a root section extending from the bottom side of the platform;

an airfoil section extending from the top side of the platform to a tip of the turbine blade, wherein the airfoil section comprises:

a leading edge extending from the top side of the platform to the tip;

a trailing edge extending from the top side of the platform to the tip and aft of the leading edge;

a pressure side extending from the leading edge to the trailing edge, and extending from the top side of the platform to the tip; and a suction side extending from the leading edge to the trailing edge, and extending from the top side of the platform to the tip;

a tip wall at the tip extending from the leading edge to the trailing edge;

a first core passage extending straight from the root section to the tip wall between the leading edge and the trailing edge;

a first tip flag passage extending adjacent to the tip wall from the first core passage to a first flag outlet on the trailing edge;

a second tip flag passage extending toward the leading edge from a second flag outlet on the trailing edge, and wherein the second tip flag passage is between the first tip flag passage and the root section; and a second core passage between the first core passage and the trailing edge, wherein the second core passage is a serpentine passage extending from the root section to the second tip flag passage, and wherein the second core passage is fluidically connected to the second tip flag passage opposite the second flag outlet.

2. The turbine blade of claim 1, wherein the second core passage comprises:

a first up pass extending from the root section toward a first bend of the second core passage, wherein the first bend is between the root section and the second tip flag passage;

a down pass extending toward the root section from the first bend to a second bend of the second core passage, wherein the down pass is positioned between the first up pass and the first core passage; and a second up pass extending to the second tip flag passage from the second bend, wherein the second up pass is positioned between the down pass and the first core passage.

3. The turbine blade of claim 2, further comprising:

a leading edge core passage extending straight from the root section to the tip wall, wherein the leading edge core is between the leading edge and the first core passage.

4. The turbine blade of claim 3, further comprising:

a plurality of leading edge cavities formed between the leading edge and the leading edge core passage; and a plurality of cross-over apertures fluidically connecting the plurality of leading edge cavities with the leading edge core passage.

5. The turbine blade of claim 4, further comprising:

a trailing edge core passage extending straight from the root section toward the second tip flag passage and is between the second core passage and the trailing edge.

6. The turbine blade of claim 5, further comprising:

a flag wall extending between the first tip flag passage and the second tip flag passage;

a first aperture formed in the flag wall and extending from the first tip flag passage to the second tip flag passage, and wherein the first aperture is aligned with the second up pass.

7. The turbine blade of claim 6, further comprising:

a second aperture extending from the first bend to the second tip flag passage and fluidically connecting the first bend and the second tip flag passage, wherein the second aperture is aligned with the first up pass.

8. The turbine blade of claim 7, further comprising:

a third aperture extending from an outer end of the trailing edge core passage to the second tip flag passage and fluidically connecting the trailing edge core and the second tip flag passage, wherein the outer end of the trailing edge core passage is opposite the root section.

9. The turbine blade of claim 2, further comprising:

a plurality of leading edge cavities formed between the leading edge and the first core passage; and a plurality of cross-over apertures fluidically connecting the plurality of leading edge cavities with the first core passage.

10. A gas turbine engine comprising the turbine blade of claim 1.

11. A turbine blade comprising:

a base;

a tip radially outward from the base in a radial direction;

an airfoil section extending from the base to the tip, wherein the airfoil section comprises:

a leading edge extending radially outward from the base to the tip;

a trailing edge extending radially outward from the base to the tip and is axially aft of the leading edge in an axial direction;

a pressure side extending from the leading edge to the trailing edge, and extending from the base to the tip; and a suction side extending from the leading edge to the trailing edge, and extending from the top side of the platform to the tip, wherein the suction side is opposite the pressure side in a circumferential direction;

a tip wall at the tip extending axially from the leading edge to the trailing edge;

a first core passage extending radially from the base to the tip wall between the leading edge and the trailing edge;

a first flag wall spaced radially inward from the tip wall and extending axially from the first core passage to the trailing edge;

a first tip flag passage between the tip wall and the first flag wall and extending axially from the first core passage to a first flag outlet on the trailing edge;

a second flag wall spaced radially inward from the first flag wall, wherein the second flag wall extends axially from the trailing edge toward the first core passage;

a second tip flag passage radially between the first flag wall and the second flag wall and extending toward the leading edge from a second flag outlet on the trailing edge; and a second core passage axially between the first core passage and the trailing edge, wherein the second core passage is a serpentine passage extending from the base to the second tip flag passage, and wherein the second core passage is fluidically connected to the second tip flag passage axially opposite to the second flag outlet.

12. The turbine blade of claim 11, wherein the second core passage comprises:

a first up pass extending radially from the base toward a first bend of the second core passage, wherein the first bend is radially between the base and the second flag wall;

a down pass extending toward the base from the first bend to a second bend of the second core passage, wherein the down pass is positioned axially between the first up pass and the first core passage; and a second up pass extending radially to the second tip flag passage from the second bend, wherein the second up pass is positioned axially between the down pass and the first core passage.

13. The turbine blade of claim 12, further comprising:

a leading edge core passage extending radially from the base to the tip wall, wherein the leading edge core is between the leading edge and the first core passage in the axial direction.

14. The turbine blade of claim 13, further comprising a plurality of leading edge boxcar cavities formed axially between the leading edge and the leading edge core passage; and a plurality of cross-over apertures extending axially from the leading edge core passage to the plurality of leading edge boxcar cavities to fluidically connect the plurality of leading edge boxcar cavities with the leading edge core passage.

15. The turbine blade of claim 14, further comprising:

a trailing edge core passage extending radially from the base to the second flag wall and is axially between the second core passage and the trailing edge relative to the axial direction.

16. The turbine blade of claim 15, further comprising:

a first aperture formed in the first flag wall and extending from the first tip flag passage to the second tip flag passage, and wherein the first aperture is axially aligned with the second up pass relative to the axial direction.

17. The turbine blade of claim 16, further comprising:

a second aperture formed in the second flag wall and extending from the first bend to the second tip flag passage and fluidically connecting the first bend and the second tip flag passage, and wherein the second aperture is aligned with the first up pass in the axial direction.

18. The turbine blade of claim 17, further comprising:

a third aperture formed in the second flag wall and extending from the trailing edge core passage to the second tip flag passage and fluidically connecting the trailing edge core and the second tip flag passage.

19. The turbine blade of claim 12, further comprising:

a plurality of leading edge boxcar cavities formed between the leading edge and the first core passage; and a plurality of cross-over apertures extending axially from the first core passage to the plurality of leading edge boxcar cavities to fluidically connect the plurality of leading edge boxcar cavities with the first core passage.

20. A gas turbine engine comprising the turbine blade of claim 11.

* * * * *